United States Patent [19]
Campbell et al.

[11] Patent Number: 5,853,809
[45] Date of Patent: Dec. 29, 1998

[54] SCRATCH RESISTANT CLEARCOATS CONTAINING SUFACE REACTIVE MICROPARTICLES AND METHOD THEREFORE

[75] Inventors: Donald H. Campbell, Farmington; Janice E. Echols, Detroit; Walter H. Ohrbom, Hartland Township, all of Mich.

[73] Assignee: BASF Corporation, Southfield, Mich.

[21] Appl. No.: 723,436

[22] Filed: Sep. 30, 1996

[51] Int. Cl.⁶ ........................................... B05D 1/36
[52] U.S. Cl. .................... 427/407.1; 427/387; 427/419.2
[58] Field of Search ................................ 427/407.1, 409, 427/387, 214, 419.2

[56] References Cited

U.S. PATENT DOCUMENTS

| | | | |
|---|---|---|---|
| 4,211,823 | 7/1980 | Suzuki et al. | 427/164 |
| 4,221,697 | 9/1980 | Osborn et al. | 427/385.5 |
| 4,456,647 | 6/1984 | Schonfelder et al. | 427/412.1 |
| 4,522,958 | 6/1985 | Das et al. | 523/212 |
| 4,677,004 | 6/1987 | Das et al. | 427/409 |
| 4,835,023 | 5/1989 | Taniguchi et al. | 427/387 |
| 4,910,097 | 3/1990 | Nomura et al. | 427/388.4 |
| 5,075,165 | 12/1991 | Kishi et al. | 428/331 |
| 5,086,087 | 2/1992 | Misev | 522/84 |
| 5,102,746 | 4/1992 | Shindou et al. | 428/623 |
| 5,104,922 | 4/1992 | Chang | 524/441 |
| 5,104,929 | 4/1992 | Bikadi | 524/847 |
| 5,112,403 | 5/1992 | Okura et al. | 106/418 |
| 5,114,756 | 5/1992 | Mirabeau et al. | 427/412.3 |
| 5,147,730 | 9/1992 | Ogishi et al. | 428/623 |
| 5,154,759 | 10/1992 | Cifuentes et al. | 106/10 |
| 5,212,216 | 5/1993 | Hattori et al. | 523/415 |
| 5,213,846 | 5/1993 | Tsuneta et al. | 427/386 |
| 5,258,225 | 11/1993 | Katsamberis | 428/33 |
| 5,314,947 | 5/1994 | Sawaragi | 524/780 |
| 5,322,873 | 6/1994 | Pohl et al. | 524/188 |
| 5,322,890 | 6/1994 | Ando et al. | 524/806 |
| 5,367,019 | 11/1994 | Sawaragi | 524/780 |
| 5,389,705 | 2/1995 | Huemke et al. | 523/417 |
| 5,397,638 | 3/1995 | Miki et al. | 428/328 |
| 5,426,131 | 6/1995 | Katsamberis | 522/16 |
| 5,438,083 | 8/1995 | Takimoto et al. | 523/401 |
| 5,439,957 | 8/1995 | Takimoto et al. | 524/101 |
| 5,445,871 | 8/1995 | Murase et al. | 428/215 |
| 5,461,102 | 10/1995 | Masuda et al. | 524/458 |
| 5,468,461 | 11/1995 | Hosoda et al. | 523/435 |

*Primary Examiner*—Diana Dudash
*Attorney, Agent, or Firm*—Anne Gerry Sabourin

[57] ABSTRACT

The present invention is a coating composition having good scratch resistance and a method for improving the scratch resistance of a coating composition. The coating composition comprises (A) a film forming binder system containing a crosslinkable resin and optionally a crosslinking agent for the crosslinkable resin;

(B) substantially colorless carbide or inorganic microparticles, range in size from about 1 to 1000 nanometers prior to incorporation in the coating composition, and the microparticles are reactive with the crosslinkable portion of the film forming binder system;

(C) a solvent system for the crosslinkable resin, optional crosslinking agent, and microparticles, wherein the crosslinkable resin is present in an amount from about 10 to about 80% by weight and the inorganic microparticles are present in an amount from 0.1 to 60.0% by weight based on the sum of the weights of the crosslinkable resin, the optional crosslinking agent, and the inorganic microparticles.

9 Claims, No Drawings

SCRATCH RESISTANT CLEARCOATS CONTAINING SUFACE REACTIVE MICROPARTICLES AND METHOD THEREFORE

FIELD OF THE INVENTION

The invention is related to a coating composition demonstrating good scratch resistance and a method for improving scratch resistance of a coating composition.

BACKGROUND OF THE INVENTION

Clearcoat coating compositions comprising the outermost automotive coating are subject to damage caused by numerous elements. These elements include environmental fallout, exposure to ultraviolet radiation emitted from sunlight, exposure to high relative humidity at high temperature, defects made by small, hard objects resulting in scratching and chipping.

A harder film may provide a clearcoat that is more resistant to environmental etch, while resulting in a film that is less scratch resistant. A softer film may provide a more scratch resistant coating, with lessened etch resistance.

Accordingly, it is most preferable to produce a coating having an optimum mix of characteristics with regard to various forms of damage resistance. In order to be commercially successful, a coating should provide as many favorable characteristics as possible. The sum of all of the characteristics of any particular coating determine its value in the real world of automotive coatings.

It is therefore, an object of the present invention to provide a clearcoat composition exhibiting good scratch resistance without compromising durability of the coating in other areas.

SUMMARY OF THE INVENTION

The present invention is directed to a clearcoat composition having good scratch resistance and a method for improving scratch resistance of a clearcoat coating composition. The scratch resistance of the coating is improved by the addition of reactive inorganic microparticles to the coating composition.

The clearcoat coating composition of the present invention comprises:

(A) a film forming binder system containing a crosslinkable resin, and optionally a crosslinking agent for the crosslinkable resin;

(B) colorless inorganic microparticles, comprising a functionality reactable with the crosslinkable resin, the microparticles prior to incorporation in the coating composition, ranging in size from about 1 to 1000 nanometers;

(C) a solvent system for the crosslinkable resin, and optional crosslinking agent; wherein the crosslinkable resin is in an amount of from 10 to 80% by weight and the inorganic microparticles are present in an amount from about 0.1 to 60% by weight, preferably 5.0 to 40% by weight, based on the sum of the weights of the crosslinkable resin, the optional crosslinking agent, and the organic microparticles.

DETAILED DESCRIPTION OF THE PREFERRED EMBODIMENT

The coating composition of the present invention comprises a binder system containing a principal crosslinkable resin. The crosslinkable resin may be any crosslinkable resin suitable for use in waterborne or essentially solvent-based, clearcoat coating compositions. As used herein, the term "crosslinkable resin" is intended to include not only those resins capable of being crosslinked upon application of heat but also those resins which are capable of being crosslinked without the application of heat. Examples of such crosslinkable resins include thermosetting acrylics, aminoplasts, urethanes, carbamate, carbonate, polyesters, epoxies, silicones and polyamides. These resins, when desired, may also contain functional groups characteristic of more than one class, as for example, polyester amides, urethane acrylates, carbamate acrylates, etc.

Acrylic resins refer to the generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include alkyl acrylates and alkyl methacrylates such as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. Where desired, various other ethylenically unsaturated monomers can be utilized in the preparation of acrylic resins, examples of which include: vinyl aromatic hydrocarbons optionally bearing halo substituents such as styrene, alpha-methyl styrene, vinyl toluene, alpha-chlorostyrene; non-aromatic monoolefinic and di-olefinic hydrocarbons optionally bearing halo substituents, such as isobutylene, 2,3-dimethyl-1-hexene, 1,3-butadiene, chlorethylene, chlorobutadine and the like; and esters of organic and inorganic acids such as vinyl acetate, vinyl propionate, isopropenyl acetate, vinyl chloride, allyl chloride, vinyl alpha chloracetate, dimethyl maleate and the like.

The above polymerizable monomers are mentioned as representative of the $CH_2=C<$containing monomers which may be employed; but essentially any copolymerizable monomer can be used.

Aminoplast resins refer to the generally known condensation products of an aldehyde with an amino-or amido-group containing substance examples of which include the reaction products of formaldehyde, acetaldehyde, crotonaldehyde, benzaldehyde and mixtures thereof with urea, melamine or benzoguanimine. Preferred aminoplast resins include the etherified (i.e. alkylated) products obtained from the reaction of alcohols and formaldehyde with urea, melamine, or benzoguanimine. Examples of suitable alcohols for preparation of these etherified products include: methanol, ethanol, propanol, butanol, isobutanol, t-butanol, hexanol, benzylalcohol, cyclohexanol, 3-chloropropanol, and ethoxyethanol.

Urethane resins refer to the generally known thermosetting resins prepared from organic polyisocyanates and organic compounds containing active hydrogen atoms as found for example in hydroxyl, and amino moieties. Some examples of urethane resins typically utilized in one in one-pack coating compositions include: the isocyanate-modified alkyd resins. Examples of systems based on urethane resins typically utilized as two-pack coating compositions include an organic polyisocyanate or isocyanate-terminated prepolymer in combination with a substance containing active hydrogen as in hydroxyl or amino groups together with a catalyst (e.g. organotin salt such as dibutyltin dilaurate). The active hydrogen-containing substance in the second pack typically is a polyester polyol, a polyether polyol, or an acrylic polyol known for use in such two-pack urethane resin systems.

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis(hydroxyethyl)cyclohexane and 2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; succinic acid; 2,2-dimethylsuccinic acid; 3,3-dimethylglutaric acid; 2,2-dimethylglutaric acid; ;maleic acid; fumaric acid; and itaconic acid. Anhydrides of the above acids, where they exist can also be employed and are encompassed by the term "polycarboxylic acid". In addition, substances which react in a manner similar to acids to form polyesters are also useful. Such substances include lactones such as caprolactone, propylolactone, and methyl caprolactone and hydroxy acids such as hydroxycaproic acid and dimethylol propionic acid. If a triol or higher hydric alcohol is used, a monocarboxylic acid such as acetic acid and benzoic acid may be used in the preparation of the polyester resin. Moreover, polyesters are intended to include polyesters modified with fatty acids or glyceride oils of fatty acids (i.e. conventional alkyd resins). Alkyd resins typically are produced by reacting the polyhydric alcohols, polycarboxylic acids, and fatty acids derived from drying, semi-drying, and non-drying oils in various proportions in the presence of a catalyst such as sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid licanic acid and elaeostearic acid.

Epoxy resins are generally known and refer to compounds or mixtures of compounds containing more than one 1,2-epoxy group of the formula

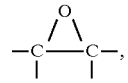

(i.e. polyepoxides). The polyepoxides may be saturated or unsaturated, aliphatic, cycloaliphatic, aromatic or heterocyclic. Examples of suitable polyepoxides include the generally known polyglycidyl ethers of polyphenol and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxylphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynapthyl)methane; and the hydrogenated derivatives thereof. The polyglycidyl ethers of polyphenols of various molecular weights may be produced, for example, by varying the mole ratio of epichlorohydrin to polyphenol.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane dials, butane dials, pentane dials, glycerol, 1,2,6-hexane trial, pentaerythritol and 2,2 bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate and isobornyl methacrylate.

The carbamate polymer can be represented by the randomly repeating units according to the following formula:

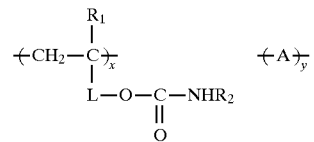

In the above formula, $R_1$, represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

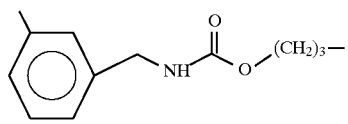

—(CH$_2$)—, —(CH$_2$)$_2$—, —(CH$_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

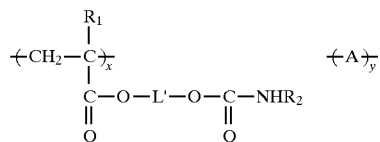

In this formula, R$_1$, R$_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an -NHCOO-urethane linkage as a residue of the isocyanate group.

When desired, generally known crosslinking agents can be incorporated in a composition of the invention particularly when the crosslinkable resin comprises a thermosetting resin containing active hydrogen or amino functionality.

As will be appreciated by one skilled in the art, the choice of crosslinking agent depends on various factors such as compatibility with the film-forming resin, the particular type of functional groups on the film-forming resin and the like. The crosslinking agent is used to crosslink the film-forming resin by either condensation reactions or non-free radical addition reactions or a combination of both of these. When for example the thermosetting reactants can be crosslinked in the presence of moisture or when the reactants include monomers having complementary groups capable of entering into crosslinking reactions, the crosslinking agent may be omitted if desired.

Representative examples of crosslinking agents include blocked and/or unblocked diisocyanates, diepoxides, aminoplasts, phenol/formaldehyde adducts, carbamates, siloxane groups, cyclic carbonate groups, and anhydride groups. Examples of such compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group. When aminoplast resins are employed as the crosslinking agent, particularly suitable are the melamine-formaldehyde condensates in which a substantial proportion of the methylol groups have been etherified by reaction with a monohydric alcohol.

A coating composition of the invention contains substantially colorless, substantially inorganic microparticles dispersed in the coating composition. These inorganic microparticles, prior to incorporation in the coating composition, have an average diameter in the range of from about 1.0 to about 1000 nanometers (i.e., from about 1.0 to about 1000 millimicrons), preferably from about 2 to about 200 nanometers, and most preferably from about 4 to about 50 nanometers.

The substantially inorganic microparticles suitable for a coating composition of the present invention, prior to incorporation in the coating composition, are in the form of a sol, preferably an organosol, of the microparticles. A particularly effective type of substantially inorganic microparticles for compositions of the invention includes a variety of silica sols of silica particles of particle size within the aforesaid range and having surface modification as described above.

The microparticles suitable for compositions of the present invention include carbides and compounds which are substantially inorganic. The substantially inorganic microparticles can, for example, comprise a core of essentially a single inorganic oxide such as silica in colloidal, fumed, or amorphorus form, or alumina, or an inorganic oxide of one type on which is deposited an inorganic oxide of another type. However, the inorganic microparticles suitable for coating compositions of the present invention ordinarily are essentially colorless so as not to seriously interfere with the light transmissive characteristics of the coating compositions when unpigmented. It is to be understood that although the substantially inorganic microparticles may be discrete or associated through physical and/or chemical means into aggregates, and although a given sample of the microparticles generally will have particles falling into a range of particle sizes, the substantially inorganic microparticles will have an average diameter in the range of from about 1 to about 150 nanometers. The substantially inorganic microparticles used as starting material for incorporation in the coating composition should be in a form suitable for dispersion in the coating composition whereby after dispersing, the substantially inorganic microparticles remain stably dispersed for a period of time at least sufficient so as not to prevent the use of the coating composition for its intended purpose. For example, a coating composition containing dispersed, inorganic microparticles, depending on the size of the inorganic microparticles and the nature of the other components employed in preparing the coating composition, in which the dispersed inorganic microparticles tend to settle over a period of time, but which can be redispersed as for example utilizing conventional paint mixing techniques, is considered to fall within the scope of the present invention.

A particularly desirable class of substantially inorganic microparticles for compositions of the present invention include sols of a wide variety of small-particle, colloidal silicas having an average diameter of from about 1 to 1000 nanometers (nm), preferably from about 2 to about 200 nm, and most preferably from about 4 to 50 nm, which silicas have been surface modified during and/or after the particles are initially formed. Such silicas can be prepared by a variety of techniques in a variety of forms, examples of which include organosols, and mixed sols. As used herein the term "mixed sols" is intended to include those dispersions of colloidal silica in which the dispersing medium comprises both an organic liquid and water. Such small particle colloidal silicas are readily available, are essentially colorless, and have referactive indices which make them suitable for combination with a variety of crosslinkable resins and solvent systems so as to form substantially transparent coating compositions when the coating compositions are free of dyes and pigments. Moreover, silicas of appropriate particle size and which have various degrees of hydrophobicity, hydrophilicity, organophobicity and organophilicity may be employed depending on compatibility with the particular crosslinkable resin and solvent system utilized in the coating composition.

The silicas ordinarily used in compositions of the invention include common colloidal forms having ultimate particles of silica which at least prior to incorporating in the coating composition may contain on the surface chemically bonded carbon-containing moieties, as well as such groups as anhydrous $SiO_2$ groups, SiOH groups, various ionic groups physically associated or chemically bonded within the surface of the silica, adsorbed organic groups and combinations thereof, depending on the particular characteristics of the silica desired.

The microparticles can be reactive with the binder either by their inherent reactivity (e.g. presence of SiOH groups) or this reactivity can be converted using one of a wide range of alkoxy silane coupling agents (e.g. glycidyl alkoxy silanes, isocyanato alkoxy silanes, amino alkoxy silanes, and carbamyl alkoxy silanes). The reactive groups on the silica allow the silica to be reacted into the crosslinkable resin without additional treatment when an aminoplast or silane crosslinking agent is used.

Where the silica surface is non-reactive with the crosslinkable resin or crosslinking agent, the inorganic particles are reacted with a coupling agent which comprises a compound having a functionality capable of covalently bonding to the inorganic particles and having a functionality capable of crosslinking into the crosslinkable resin, where both functionalities are reacted onto a backbone of the coupling agent. The backbone of the coupling agent is a polyvalent linking group. Examples of the polyvalent linking group include polyvalent radicals such as silicone and phosphorus, alkyl groups, oligomers or polymers such as acrylic, urethane, polyester, polyamide, epoxy, urea and alkyd oligomers and polymers.

Examples of the functionality that reacts with the inorganic particle include hydroxyl, hydroxy ether, phenoxy, silane and aminoplast functionalities. Where a hydrophilic functional group is desired, as for use in a waterborne coating, hydrophobic functional groups may be reacted with groups such as an acid to render the functionality hydrophilic. These added hydrophilic groups may or may not be crosslinked into the cured film.

The functionality reactive with the crosslinkable resin includes carbamate, isocyanate, carboxyl, epoxy, hydroxyl, amine, urea, amide, aminoplast and silane functionalities. For purposes of the present invention, the preferred reactive functionality is a hydroxyl, carbamate, isocyanate or aminoplast functionality. Where necessary, these groups can be blocked prior to reaction with the inorganic microparticles, then later unblocked to react with the crosslinker or crosslinkable resin. Alternatively, the functionality reactive with the crosslinker or crosslinkable resin can be incorporated onto the coupling agent after reaction onto the microparticles.

Preferred coupling agents for purposes of the present invention have the formula

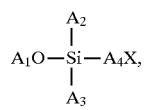

where $A_1$, $A_2$, $A_3$ and $A_4$ are the same or different and are hydrogen, or alkyl of 1 to 20 carbons, alkoxy alkyl wherein the alkyl group is 1 to 20 carbons. The $SiOA_1$ bond is capable of hydrolyzing and reacting with the inorganic particle surface. The X group comprises any functionality reactable with the crosslinkable resin or the crosslinker of the coating composition. Examples of such functionalities are set forth above. Preferably the X group comprises carbamate, hydroxyl, epoxy or isocyanate functionality, most preferably carbamate. The isocyantate, amine and hydroxy coupling agents are commercially available. Examples of commercially available silane coupling agents include Dow Corning No. 21 Additive, an amino methoxy silane; Dow Corning Z-6040 a glycidoxy functional silane; and Silquist A1310, an isocyanato functional silane.

Alternatively, the hydroxyl, hydroxy ether or silane is reacted onto the silica by forming a colloidal dispersion of the silica in an alcohol, such as a lower monohydric alcohol or ether containing alcohols followed by reacting the silica with compounds to provide functionality that is reactable with the crosslinkable resin, or the crosslinking agent. Such functionality may be provided by forming a colloidal dispersion of the silica in an alcohol such as a lower monohydric alcohol, examples of which include methanol, ethanol, n-propanol, isopropanol, n-butanol, and ether containing alcohols such as ethylene glycol monomethyl ether, ethylene glycol monoethyl ether, diethylene glycol monomethyl ether, propylene glycol monomethyl ether, dipropylene glycol monomeythyl ether, dipropylene glycol monoethyl ether, propylene glycol monobutyl ether, and dipropylene glycol monobutyl ether.

Such dispersions may be prepared by controlled addition of an aqueous silica sol to the alcohol while simultaneously removing water for example by distillation under conditions that are not sufficient to effect substantial chemical reaction between the hydroxyl groups of the alcohol and the silanol groups of the colloidal silica.

The clearcoat compositions of the present invention may comprise a solvent borne or waterborne system or may be a powder or powder slurry system. The term "solvent borne system" is used herein, in a broad sense and is intended to include true solvents as well as liquid diluents for the crosslinkable resin and optional crosslinking agent which are not true solvents for these components. The solvent system is organic, a mixture of organic solvents, a mixture of organic solvent and water or water alone. When the solvent system comprises both water and an organic portion, the components are usually miscible in the proportions employed. The relationship between the solvent system and the crosslinkable resin depends upon the relative natures of these materials and upon the relative amounts used. Such factors as solubility, miscibility, polarity, hydrophilicity, hydrophobicity, are factors which may be considered.

In a preferred embodiment of the invention, the solvent is present in the clearcoat composition in an amount of from about 0.01 weight percent to about 99 weight percent, preferably from about 10 weight percent to about 60 weight percent, and more preferably from about 30 weight percent to about 50 weight percent.

The clearcoat composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids.

Clear coating compositions may also include optional ingredients such as various fillers, plasticizers; antioxidants; surfactants, catalysts to promote drying or curing, flow control agents, thixotropes and additives for sag resistance and/or pigment.

Coating compositions can be coated on the article by any of a number of techniques well-known in the art. These include, for example, spray coating, dip coating, roll coating, curtain coating, and the like. For automotive body panels, spray coating is preferred.

The clear coat composition is applied to a substrate having a pigmented basecoat composition thereon. Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C., and are preferably between 121° C and 141° C. The curing time will vary depending on the particular components used, and physical parameters such as the thickness of the layers, however, typical curing times range from 15 to 60 minutes.

The present invention is illustrated by the following non-limiting examples.

EXAMPLES

Example 1

Carbamate Functional Silane Coupling Agent

To a 1L flask kept under an inert atmosphere were added 275.7 g of methyl amyl ketone, 205 g of 3-isocyanatopropyl-1-trimethoxysilane, and 0.16 grams of dibutyl tin dilaurate. The system was then heated to about 40° C. 119 grams of hydroxy propyl carbamate was then added, followed by addition of 14 grams of methyl amyl ketone. The system was kept at about 40° C. until the reaction was complete as determined by IR spectrometry. 10 grams of methanol was then added. The final product has a theoretical NV of 50%, carbamate functionality of 325 g/equ and a methoxy functionality of 108.3 g/equ (or 325 g/equ of Si(OMe)$_3$.

Example 2

Carbamate Functional Silica A

To 400 grams of colloidal silica (Nalco 1057 from Nalco colloids), 4 grams of water and 22.5 grams of the coupling agent from Example 1 were added. This mixture was then placed in an oven at 140° F. (60° C.) for 16 hours.

Examples 3A-3C

Clearcoat Compositions

Example 3A

Control Clearcoat 264.1 grams of URECLEAR®[1] clearcoat without silica. [1] Ureclear® is a registered trademark for a clearcoat containing a carbamate functional acrylic resin, and is available from BASF Corporation.

Example 3B

Clearcoat with Untreated Silica 264.1 grams of URECLEAR® clearcoat, as used in Ex. 3A were combined under agitation with 62.85 grams of Nalco 1057 colloidal silica without the coupling agent and 54.0 grams of methyl isoamyl ketone methyl-2-hexanone.

Example 3C

Clearcoat with Surface Treated Silica

To 264.1 grams of URECLEAR® clearcoat as used in Ex.3A, were combined, under agitation, with 62.85 grams of carbamate functional silica from Example 2 and 60 grams of methyl isoamylketone methyl-2-hexanone was added.

These clearcoats were sprayed wet-on-wet over a black high solids basecoat onto electrocoated primed 4"×12" panels. These panels were flashed at ambient temperatures for 10 minutes and then cured for 20 minutes at 270° F. (132.20° C). After 24 hours, the scratch and mar resistance was evaluated.

The panels were subjected to a scratch and mar resistance testing, where the person conducting the test was unaware of the coating composition being tested. The test method is Test Method FL-TM-BI-161-01 testing is described as follows.

Panels were aged 24 hours. Three panels were evaluated. Three 1.5"×4" areas on each panel with good gloss, distinctness of image (DOI) and little or no dirt were demarkated and measured for gloss. Gloss was measured by using the statistics mode on the glossmeter, measuring the initial gloss of each of the three areas by taking the average of at least three readings in each, with the beam perpendicular to the 4" length. The average initial gloss as well as the standard deviation of each gloss was measured. The standard deviation was less than 0.5 gloss units and the range of the three averages was less than 1.5 gloss units.

A 50 mm×50 mm square of 3M polishing paper was cut and placed on felt squares, with the abrasive side away from the felt. The two squares were mounted on the finger of the Crockmeter with the felt between the finger of the crockmeter and the abrasive paper. A constant orientation of the abrasive paper with respect to the direction of marring was maintained. The two squares are secured with a hose clamp. The panel was placed on the Crockmeter such that the finger marred the panel in one of the three areas demarkated on the panel. The motion of the Crockmeter was parallel to the 4" dimension. The test surface was subjected to 10 double strokes of the Crockmeter. The marring process was repeated in the other two areas of the panel, changing the abrasive paper each time. The gloss was again measured in each of the three marred areas by the same method as the first gloss measurement. The higher degree of gloss retention indicates less scratching.

The results of the testing are set forth in Table 1.

TABLE 1

Scratch and Mar Resistance Results Ex. 3A–3C

| Example | Gloss Retention |
| --- | --- |
| 3A (control) | 80.7% |
| 3B | 89.2% |
| 3C | 93.9% |

Example 4
Polymeric Carbamate Functional Silane Coupling Agent

A hydroxy functional carbamate resin was prepared having a hydroxy equivalency of 1650 g/equivalent at 95% non-volatile content. To 922 grams of the hydroxy functional carbamate acrylic were added the following:

| Ingredient | Wt (g) |
| --- | --- |
| F) Silquest A-1310 Silane | 123.8 |
| G) Amyl acetate (urethane grade) | 20.0 |
| H) Amyl acetate | 127.3 |
| n-Butanol | 10.0 |

Example 5
Carbamate Functional Silica B

To 1500 grams of colloidal silica (Nalco 1057 from Nalco colloids), 60 grams of the coupling agent from Example 4 was added. This mixture was then placed in an oven at 140° F. (60° C.) for 16 hours. This resulted in a carbamate functional colloidal silica dispersion of 31.3% Nonvolatile content.

Examples 6A–6C

Example 6A
Clearcoat with Carbamate Functional Silica

Sample 6A was prepared by adding 260.1 grams of the carbamate functional silica B from Example 5 to 134.3 grams of URECLEAR® clearcoat[1], a clearcoat containing a carbamate functional acrylic resin, sold by BASF Corporation, at 75.4% NV. This gave a clearcoat with 75% solid silica dispersion based on the weight of solid URECLEAR®.

Example 6B
Clearcoat with Carbamate Functional Silica 208.0 grams of the carbamate functional silica B from Example 5 were added to 277.5 grams of URECLEAR® clearcoat as described in Ex. 6A, at 72.4% NV. This gave a clearcoat with 30% solid silica dispersion based on the weight of solid URECLEAR®.

Example 6C
Clearcoat without Carbamate Functional Silica

URECLEAR® clearcoat as described in Ex. 6, at 54% NV.

These clearcoats were spray applied wet on wet over a black high solids basecoat onto electrocoated 4"×12" panels. These panels were cured for 20' at 270° F. (132.2° C.). After cooling, the scratch and mar resistance was evaluated using the above described test method (FL-TM-BI-161-01). The higher degree of gloss retention indicates less scratching.

TABLE 2

Scratch Resistance

| Example | Gloss Retention |
| --- | --- |
| 6A | 95.0% |
| 6B | 86.0% |
| 6C (control) | 77.3% |

We claim:

1. A method for forming a scratch resistant automotive coating comprising
   I) applying to a substrate a pigmented basecoat composition;
   II) forming a basecoat film of the coating composition applied in I);
   III) applying to the basecoat film a clearcoat coating composition, wherein the clearcoat coating composition comprises
      (A) a film forming binder system containing a crosslinkable resin and optionally a crosslinking agent reactive with the crosslinkable resin;
      (B) substantially colorless inorganic microparticles, ranging in size from about 1 to 1000 nanometers prior to incorporation into the clearcoat composition, wherein the microparticles are reacted with a divalent coupling agent to form composite particles of the inorganic particles and coupling agent, said coupling agent comprising a backbone portion which is a polyvalent linking group having thereon a first functionality reactive with the inorganic particles, and a second functionality reactive with the crosslinkable resin;
      (C) a solvent system for the crosslinkable resin, optional crosslinking agent, and microparticles, wherein the crosslinkable resin is present in an amount from about 10 to about 80% by weight and the inorganic microparticles are present in an amount from 0.1 to 60.0% by weight based on the sum of the weights of the crosslinkable resin, the optional crosslinking agent, and the inorganic microparticles; and
   IV) baking the basecoat and clearcoat either separately or together to form a cured film on the substrate.

2. The method of claim 1 wherein the inorganic microparticles are selected from the group consisting of silica, fumed silica, and colloidal silica.

3. The method of claim 1 wherein the microparticles range in size from 2.0 to 200 nanometers.

4. The method of claim 1 wherein the clearcoat composition applied to the substrate includes a coupling agent reactive with the microparticles comprising a compound comprising a polyvalent backbone which is selected from the group consisting of silicone and phosphorus radicals, alkyl groups having a carbon chain length of from 1 to 12 carbon atoms, compounds selected from the group consisting of acrylic, polyester, polyether, urethane, urea, polyamide, epoxy, and alkyd oligomers and polymers, and mixtures thereof;

the first functionality reactive with the inorganic particles is selected from the group consisting of hydroxy, phenoxy, hydroxy ether, silane and aminoplast functionalities; and the second functionality reactive with the crosslinkable resin is selected from the group consisting of carbamate, isocyanate, carboxyl, epoxy, amine, urea, amide, silane and aminoplast functionalities.

5. The method of claim 1, wherein the inorganic microparticles comprise colloidal silica and the coupling agent reacted with the inorganic particles further comprise a primary carbamate functionality that is reactive with the crosslinkable resin.

6. The method of claim 1 wherein the inorganic particles further comprise an SiOH reactive functionality on the surface of the particles.

7. The method of claim 6 wherein the clearcoat comprises a crosslinking agent selected from the group consisting of aminoplast and silane crosslinking agents.

8. The method of claim 1 wherein the microparticles are present in an amount between 5.0 and 40% based on the total weight of the crosslinkable resin, crosslinker and microparticles.

9. A method for forming a scratch resistant coating comprising

I) applying to a substrate a pigmented basecoat composition;

II) forming a basecoat film of the coating composition applied in I);

III) applying to the basecoat film a clearcoat coating composition, wherein the clearcoat coating composition comprises (A) a film forming binder system containing a crosslinkable resin and optionally a crosslinking agent reactive with the crosslinkable resin;

(B) colloidal silica microparticles, ranging in size from about 1 to 1000 nanometers prior to incorporation into the clearcoat composition, wherein the microparticles are reacted with a divalent coupling agent to form composite particles of the inorganic particles and coupling agent, said coupling agent comprising a polyvalent backbone which is selected from the group consisting of silicone and phosphorus radicals, alkyl groups having a carbon chain length of from 1 to 12 carbon atoms, compounds selected from the group consisting of acrylic, polyester, polyether, urethane, urea, polyamide, epoxy, and alkyd oligomers and polymers, and mixtures thereof;

the first functionality reactive with the inorganic particles is selected from the group consisting of hydroxy, phenoxy, hydroxy ether, silane and aminoplast functionalities; and the second functionality reactive with the crosslinkable resin is selected from the group consisting of carbamate, isocyanate, carboxyl, epoxy, amine, urea, amide, silane and aminoplast backbone;

(C) a solvent system for the crosslinkable resin, optional crosslinking agent, and microparticles, wherein the crosslinkable resin is present in an amount from about 10 to about 80% by weight and the inorganic microparticles are present in an amount from 0.1 to 60.0% by weight based on the sum of the weights of the crosslinkable resin, the optional crosslinking agent, and the inorganic microparticles; and IV) baking the basecoat and clearcoat either separately or together to form a cured film on the substrate.

* * * * *